United States Patent
Mitsuta et al.

(10) Patent No.: US 9,597,997 B2
(45) Date of Patent: Mar. 21, 2017

(54) WORK VEHICLE PERIPHERY MONITORING APPARATUS

(75) Inventors: Shinji Mitsuta, Hiratsuka (JP); Shigeru Harada, Chigasaki (JP); Tomikazu Tanuki, Fujisawa (JP); Eishin Masutani, Hiratsuka (JP); Yukihiro Nakanishi, Hiratsuka (JP); Takeshi Kurihara, Hiratsuka (JP); Dai Tsubone, Hiratsuka (JP); Masaomi Machida, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 543 days.

(21) Appl. No.: 13/814,192

(22) PCT Filed: May 24, 2012

(86) PCT No.: PCT/JP2012/063254
§ 371 (c)(1),
(2), (4) Date: Feb. 4, 2013

(87) PCT Pub. No.: WO2012/169361
PCT Pub. Date: Dec. 13, 2012

(65) Prior Publication Data
US 2013/0141581 A1 Jun. 6, 2013

(30) Foreign Application Priority Data
Jun. 7, 2011 (JP) .................... 2011-127477

(51) Int. Cl.
*H04N 7/18* (2006.01)
*B60Q 1/00* (2006.01)
(Continued)

(52) U.S. Cl.
CPC .............. *B60Q 1/00* (2013.01); *B60R 1/00* (2013.01); *H04N 7/002* (2013.01); *B60R 2300/301* (2013.01); *B60R 2300/607* (2013.01)

(58) Field of Classification Search
CPC .............. G01S 13/931; G01S 13/9317; G01S 13/9332; G01S 13/9353; G01S 13/9371;
(Continued)

(56) References Cited

U.S. PATENT DOCUMENTS 6,268,803 B1 * 7/2001 Gunderson et al. .......... 340/903
6,373,472 B1 * 4/2002 Palalau et al. ................ 345/173
(Continued)

FOREIGN PATENT DOCUMENTS

JP 2003-146133 A 5/2003
JP 2006-341641 A 12/2006
(Continued)

OTHER PUBLICATIONS

International Search Report of corresponding PCT Application No. PCT/JP2012/063254.

*Primary Examiner* — Michael Lee
(74) *Attorney, Agent, or Firm* — Global IP Counselors, LLP

(57) ABSTRACT

A periphery monitoring apparatus for a work vehicle includes a plurality of obstacle detection sensors, a warning region setting section and a warning section. The obstacle detection sensors are mounted on the work vehicle, and each of the obstacle detection sensors is configured to determine a relative position of an obstacle with regard to the work vehicle by detecting the obstacle in the surroundings of the work vehicle. The warning region setting section is configured to set a warning region, where it is necessary to warn a driver of a presence of the obstacle, according to a movement state of the work vehicle. The warning section is configured to warn a driver that the relative position of the obstacle is positioned in the warning region.

6 Claims, 8 Drawing Sheets

(51) Int. Cl.
*B60R 1/00* (2006.01)
*H04N 7/00* (2011.01)

(58) Field of Classification Search
CPC .......... G01G 1/16; H04N 7/181; H04N 7/002;
B60Q 1/00; B60R 1/00; B60R 2300/301;
B60R 2300/007
USPC ............ 348/118, 148; 342/70, 55, 385, 457;
340/436, 901; 701/28, 301
See application file for complete search history.

(56) References Cited

U.S. PATENT DOCUMENTS

| | | | |
|---|---|---|---|
| 2002/0180597 A1* | 12/2002 | Flick | 340/436 |
| 2005/0073433 A1* | 4/2005 | Gunderson et al. | 340/903 |
| 2005/0075770 A1* | 4/2005 | Taylor et al. | 701/36 |
| 2006/0029271 A1* | 2/2006 | Miyoshi et al. | 382/154 |
| 2007/0057816 A1* | 3/2007 | Sakakibara et al. | 340/932.2 |
| 2008/0238636 A1* | 10/2008 | Birging et al. | 340/426.1 |
| 2009/0259400 A1 | 10/2009 | Coats et al. | |
| 2011/0026771 A1* | 2/2011 | Hsu et al. | 382/104 |
| 2011/0058923 A1* | 3/2011 | Campbell et al. | 414/400 |
| 2011/0102552 A1* | 5/2011 | Diehl et al. | 348/47 |
| 2011/0175752 A1* | 7/2011 | Augst | 340/905 |
| 2011/0234802 A1* | 9/2011 | Yamada et al. | 348/148 |
| 2012/0025964 A1* | 2/2012 | Beggs et al. | 340/435 |
| 2012/0062743 A1* | 3/2012 | Lynam et al. | 348/148 |
| 2013/0250114 A1* | 9/2013 | Lu | 348/148 |

FOREIGN PATENT DOCUMENTS

| | | |
|---|---|---|
| JP | 2007-235529 A | 9/2007 |
| JP | 2010-204821 A | 9/2010 |
| JP | 2010-208483 A | 9/2010 |

\* cited by examiner

WORK VEHICLE PERIPHERY MONITORING APPARATUS

CROSS-REFERENCE TO RELATED APPLICATIONS

This application claims priority to Japanese Patent Application No. 2011-427477 filed on Jun. 7, 2011, the disclosure of which is hereby incorporated herein by reference in its entirety.

TECHNICAL FIELD

The present invention relates to a periphery monitoring apparatus which monitors the surroundings of a work vehicle.

BACKGROUND ART

In the past, as extra-large work vehicles, dump trucks for carrying crushed rock at a mine or the like have been widely used. In such dump trucks, it is difficult for a driver to grasp the circumstances in the periphery of the work vehicle using side mirrors and the like since the vehicle width is remarkably wide in comparison with a typical vehicle, and in addition, the length from the front to back is long.

Therefore, a periphery monitoring system, which is provided with obstacle detection sensors, a monitor, and a controller which is connected to the obstacle detection sensors and the monitor, is proposed with the object of the circumstances in the periphery of the work vehicle being simply grasped by the driver (refer to US 2009/0259400 A1). In the periphery monitoring system, in a case where an obstacle is detected by the obstacle detection sensors, the driver is warned of the presence of the obstacle by the presence of the obstacle being displayed on the monitor.

SUMMARY

However, in the system described in US 2009/0259400 A1, there are cases where warnings which are unnecessary to the driver are carried out since the driver is warned of the presence of an obstacle without any relation to the movement state of the work vehicle. For example, the driver is warned of the presence of an obstacle to the rear of the vehicle even when the driver is paying attention to the front as in a case where the work vehicle is progressing forward.

The present invention is carried out in consideration of the circumstances described above and has an object of providing a periphery monitoring apparatus which is able to suppress unnecessary warnings.

A periphery monitoring apparatus for a work vehicle of a first aspect includes a plurality of obstacle detection sensors being mounted on the work vehicle, each of the plurality of obstacle detection sensors being configured to determine a relative position of an obstacle with regard to the work vehicle by detecting the obstacle in the surroundings of the work vehicle; a warning region setting section configured to set a warning region, where it is necessary to warn a driver of the presence of an obstacle, according to a movement state of the work vehicle; and a warning section configured to warn a driver that the relative position is positioned in the warning region.

According to the periphery monitoring apparatus for a work vehicle of the first aspect, it is possible to suppress warnings being carried out in a case where necessity of warning the driver of the presence of an obstacle is low in consideration of the movement state since the warning region is set according to the movement state of the work vehicle.

A periphery monitoring apparatus for a work vehicle of a second aspect is related to the first aspect, the movement state is defined by a combination of moving direction and vehicle speed.

According to the periphery monitoring apparatus for a work vehicle of the second aspect, it is possible to easily gauge the movement state to correspond to various movement states of the work vehicle.

A periphery monitoring apparatus for a work vehicle of a third aspect is related to the first or the second aspect, and further includes a plurality of cameras being mounted on the work vehicle, each of the plurality of cameras being configured to acquire an image of the surroundings of the work vehicle; and a bird's-eye image acquiring section being configured to acquire a bird's-eye image of the surroundings of the work vehicle based on the plurality of images which are acquired by the plurality of cameras. The warning section has a determination section which determines whether the relative position is positioned in the warning region on the bird's-eye image.

A periphery monitoring apparatus for a work vehicle of a fourth aspect is related to third aspect, and further includes a monitor being configured to display an image. The warning section has a display control section configured to display a camera image on the monitor in a case where it is determined that the relative position is positioned in the warning region on the bird's-eye image, the camera image being acquired by a camera which is acquiring the image of the obstacle out of the plurality of cameras.

According to the periphery monitoring apparatus for a work vehicle of the fourth aspect, it is possible for the driver to easily grasp the presence of an obstacle since it is possible to carry out a visual warning of the presence of an obstacle with regard to the driver.

A periphery monitoring apparatus for a work vehicle of a fifth aspect is related to the fourth aspect, the display control section displays the bird's-eye image on the monitor to line up with the camera image.

According to the periphery monitoring apparatus for a work vehicle of the fifth aspect, it is possible for the driver to more easily grasp the presence of an obstacle since it is possible for the driver to visually recognize the position of an obstacle in the bird's-eye image.

A periphery monitoring apparatus for a work vehicle of a sixth aspect is related to the fifth aspect, the display control section is configured to overlay an identification mark on the obstacle in the bird's-eye image displayed on the monitor.

According to the periphery monitoring apparatus for a work vehicle of the sixth aspect, it is possible for the driver to more easily grasp the presence of an obstacle since the obstacle is more conspicuous.

A periphery monitoring apparatus for a work vehicle of a seventh aspect is related to the fifth or the sixth aspect, the display control section is configured to display an identification frame encompassing the obstacle in the bird's-eye image displayed on the monitor.

According to the periphery monitoring apparatus for a work vehicle of the seventh aspect, it is possible for the driver to more easily grasp the presence of an obstacle since the obstacle is more conspicuous.

In the present invention such as above, it is possible to provide a periphery monitoring apparatus which is able to suppress unnecessary warnings.

DESCRIPTION OF EMBODIMENTS

Below, an embodiment of the present invention will be described by referencing the diagrams. Here, in the description below, "front", "back", "left" and "right" are terms with a driver who is sitting in a driver's seat as a reference, and "vehicle width direction" has the same meaning as "left and right direction".

Overall Configuration of Dump Truck

Figure 1:
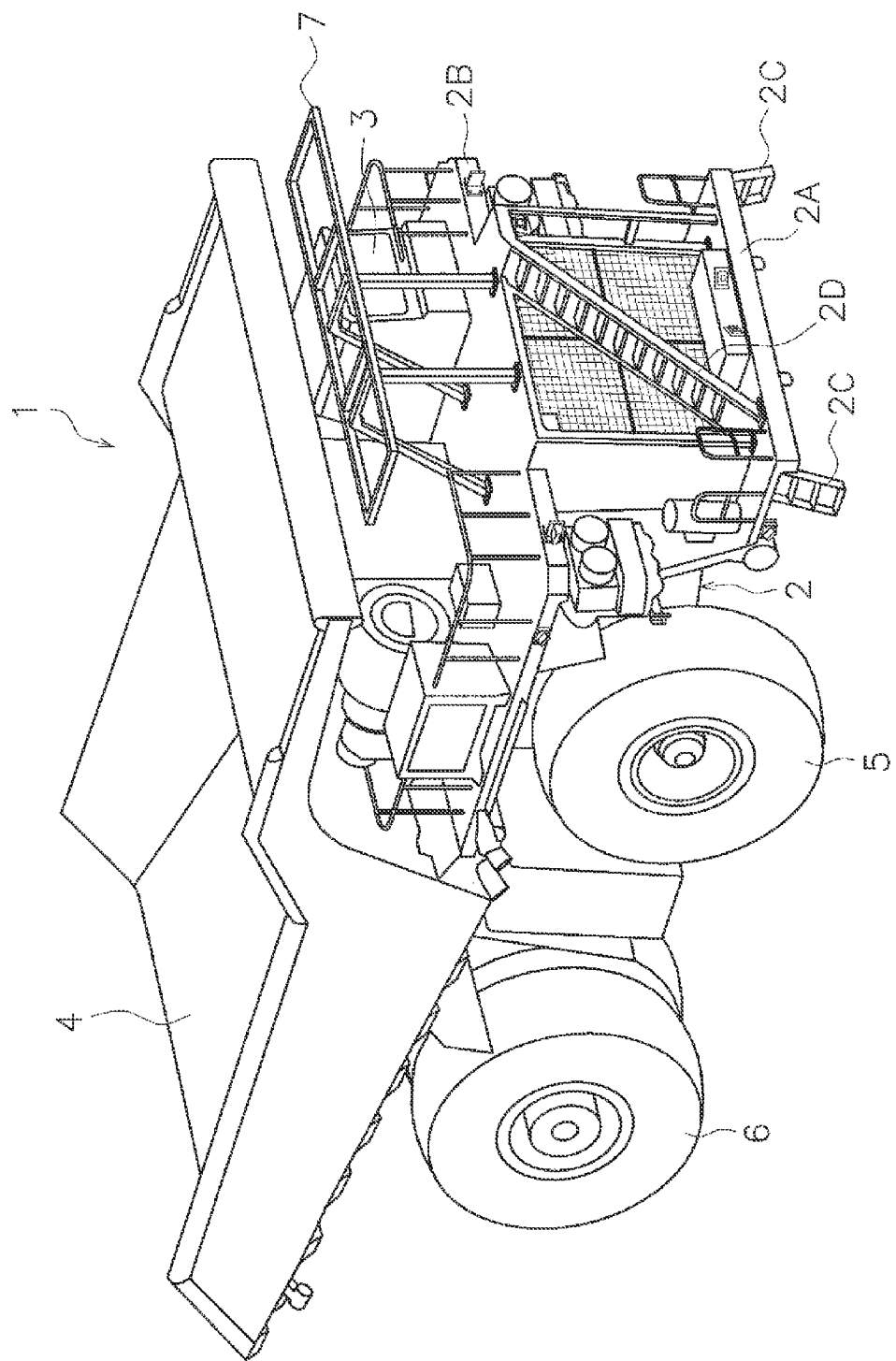
FIG. 1 is a perspective diagram illustrating an overall configuration of a dump truck 1.

FIG. 1 is a perspective diagram illustrating an overall configuration of a dump truck 1. The dump truck 1 is a self-propulsion type of extra-large work vehicle which is used in mining operations and the like.

The dump truck 1 is mainly provided with a vehicle body frame 2, a cab 3, a vessel 4, two front wheels 5, two rear wheels 6, and a base 7. In addition, the dump truck 1 is provided with a periphery monitoring apparatus 10 which monitors the surroundings of the vehicle and displays the results on a monitor. The configuration and operations of the periphery monitoring apparatus 10 will be described later.

The vehicle body frame 2 supports a diesel engine, a driving mechanism such as a transmission unit, other auxiliary units, and the like which are not shown. In addition, the front wheels 5 (only the right front wheel is shown in the diagram in FIG. 1) are supported in the left and right of the front portion of the vehicle body frame 2, and the rear wheels 6 (only the right rear wheel is shown in the diagram in FIG. 1) are supported in the left and right of the rear portion of the vehicle body frame 2. The vehicle body frame 2 has a lower deck 2A at a side which is close to the ground surface and has an upper deck 2B above the lower deck 2A. Two movable ladders 2C are provided between the lower deck 2A and the ground surface and a sloping ladder 2D is provided between the lower deck 2A and the upper deck 2B. Hand rails with a palisade shape are fixed in the left and right of the front portion, the side portion, and a portion of the back portion on the upper deck 2B.

The cab is disposed to be lateralized towards the left side from the center in the vehicle width direction above the upper deck 2B. A driver's seat, a shift lever, a controller, a monitor, a handle, an acceleration pedal, a brake pedal, and the like are provided in the cab 3. As will be described later, the controller, the monitor, and the shift level configure a portion of the periphery monitoring apparatus 10.

The vessel 4 is a container for hauling heavy materials such as crushed rocks. A bottom portion at the rear side of the vessel 4 is connected to a rear edge portion of the vehicle body frame 2 so as to be able to rotate via a rotation pin (which is not shown). Due to this, it is possible for the vessel 4 to take an erect posture, where loading materials are discharged by the front portion being rotated upward using an actuator such as a hydraulic cylinder which is not shown, and a hauling posture where the front portion is position at an upper portion of the cab as shown in FIG. 1.

The base 7 is disposed above the upper deck 2B. The base 7 is a power supply apparatus for mounting a pantograph which receives electrical power from a bird's-eye wire such as a trolley.

Configuration of Periphery Monitoring Apparatus 10

Figure 2:
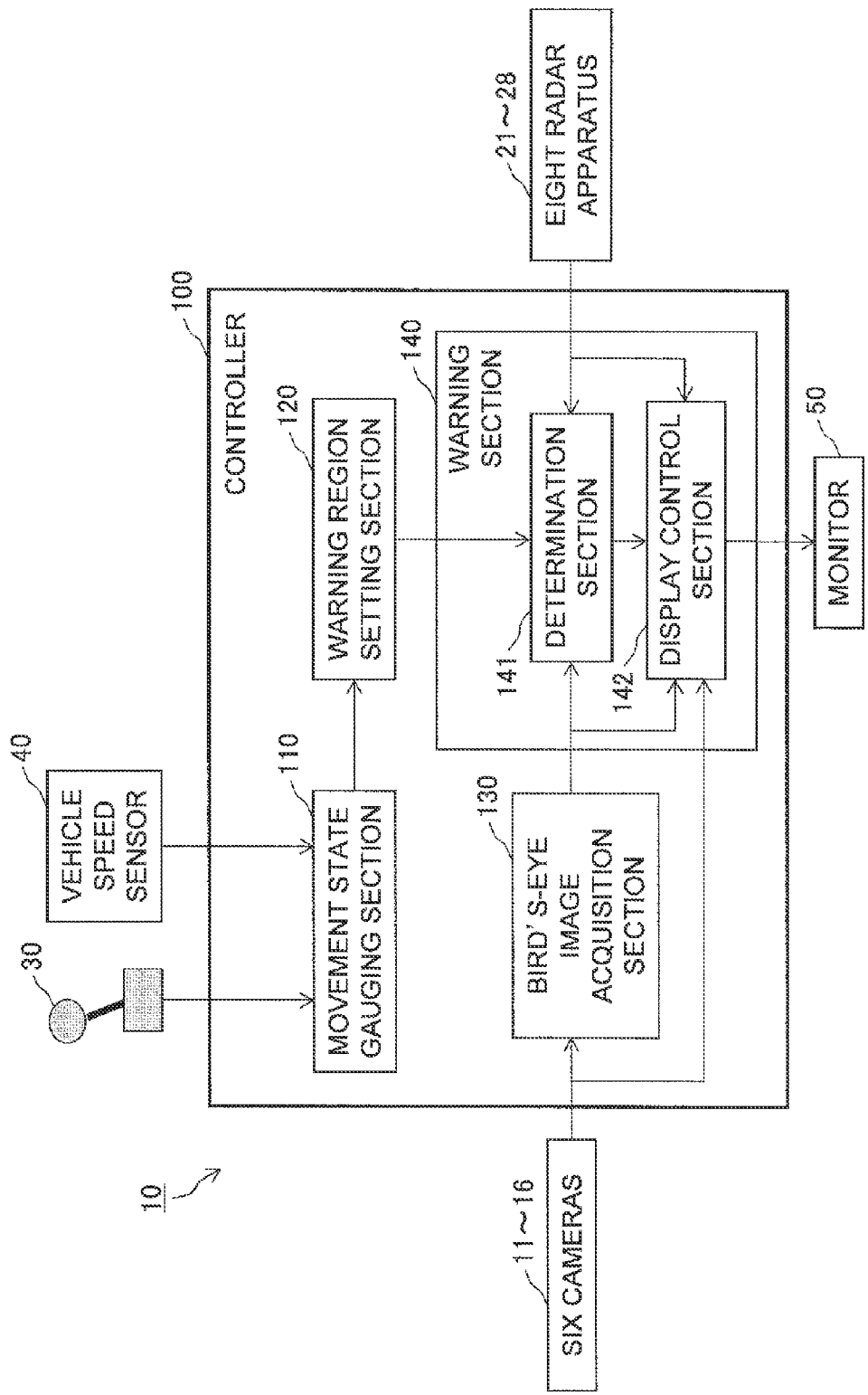
FIG. 2 is a block diagram illustrating a configuration of a periphery monitoring apparatus 10 which is provided on the dump truck 1.

FIG. 2 is a block diagram illustrating a configuration of the periphery monitoring apparatus 10 which is provided on the dump truck 1. The periphery monitoring apparatus 10 has six cameras 11 to 16, eight radar apparatuses 21 to 28, a shift lever 30, a vehicle speed sensor 40, a monitor 50, and a controller 100.

(1) Six Cameras 11 to 16

Figure 3:
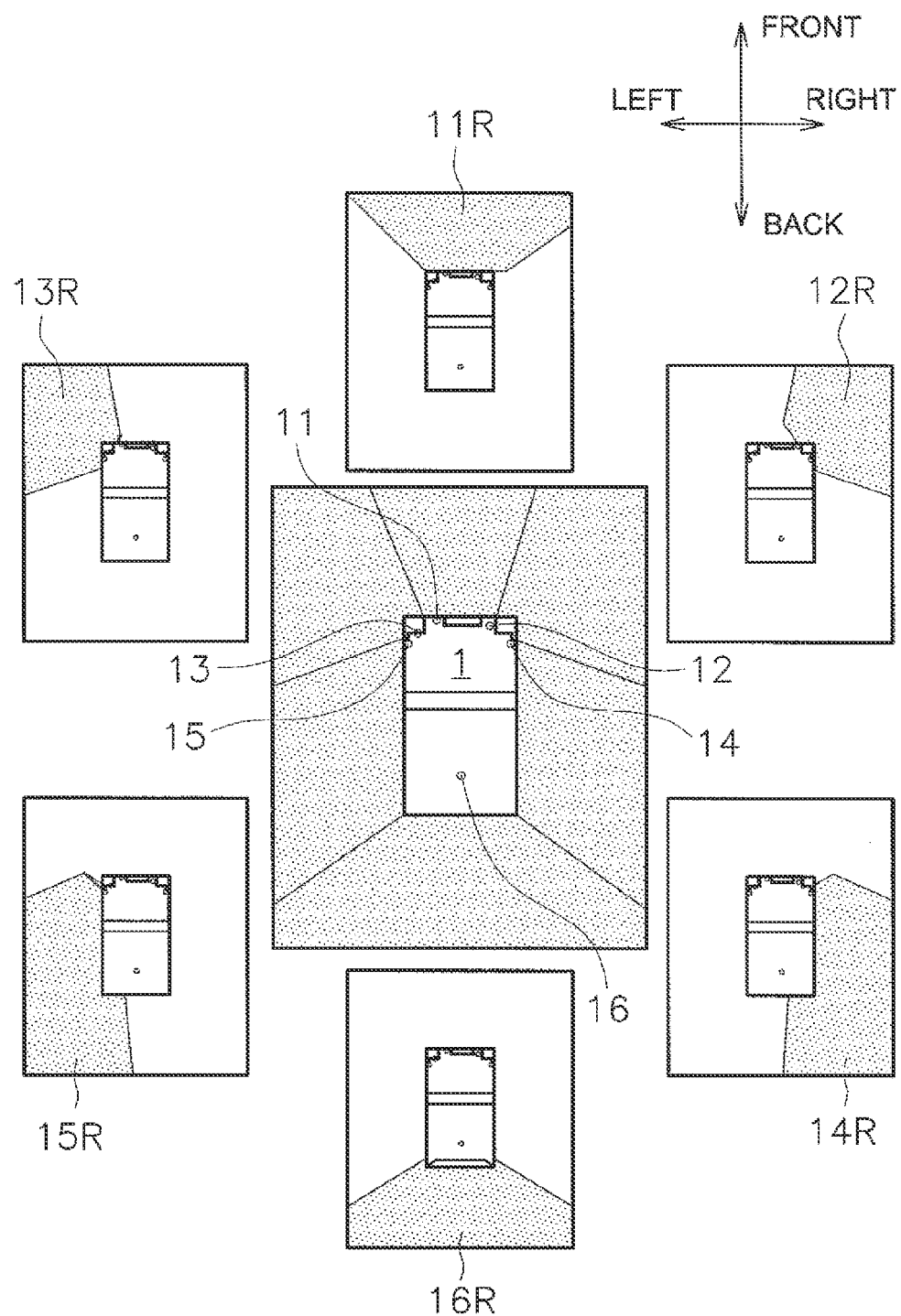
FIG. 3 is an upper surface diagram illustrating mounting positions and videoing ranges of six cameras 11 to 16.

The six cameras 11 to 16 acquire images of the surroundings of the dump truck 1. The six cameras 11 to 16 are mounted on the outer periphery of the dump truck 1. FIG. 3 is an upper surface diagram of the dump truck 1 which illustrates mounting positions and videoing ranges of the six cameras 11 to 16. Here, in FIG. 3, the videoing ranges are shown in a range which is used for a bird's-eye image 200 (refer to FIG. 7) which will be described later.

A first camera 11 is disposed at an upper edge portion of the sloping ladder 2D and a first videoing range 11R is the front of the vehicle. A second camera 12 is disposed at a right edge portion on a front side surface of the upper deck 2B and a second videoing range 12R is the front right diagonal of the vehicle. A third camera 13 is disposed at a position which is left and right symmetrical with the second camera 12, that is, a left edge portion on a front side surface of the upper deck 2B and a third videoing range 13R is the front left diagonal. A fourth camera 14 is disposed at a front edge portion on a right side surface of the upper deck 2B and a fourth videoing range 14R is the rear right diagonal. A fifth camera 15 is disposed at a position which is left and right symmetrical with the fourth camera 14, that is, a front edge portion on a left side surface of the upper deck 2B and a fifth videoing range 15R is the rear left diagonal. A sixth camera 16 is disposed in the vicinity of a rotation shaft of the vessel 4 above the axel shaft which connects the two rear wheels 6 and the sixth videoing range is to the rear.

According to the six cameras 11 to 16 above, as shown in the center diagram of FIG. 3, it is possible to acquire an image of substantially the entire surroundings of the dump truck 1. Each of the six cameras 11 to 16 sends image data which shows an image which is videoed by the apparatus to the controller 100.

(2) Eight Radar Apparatuses 21 to 28

Figure 4:
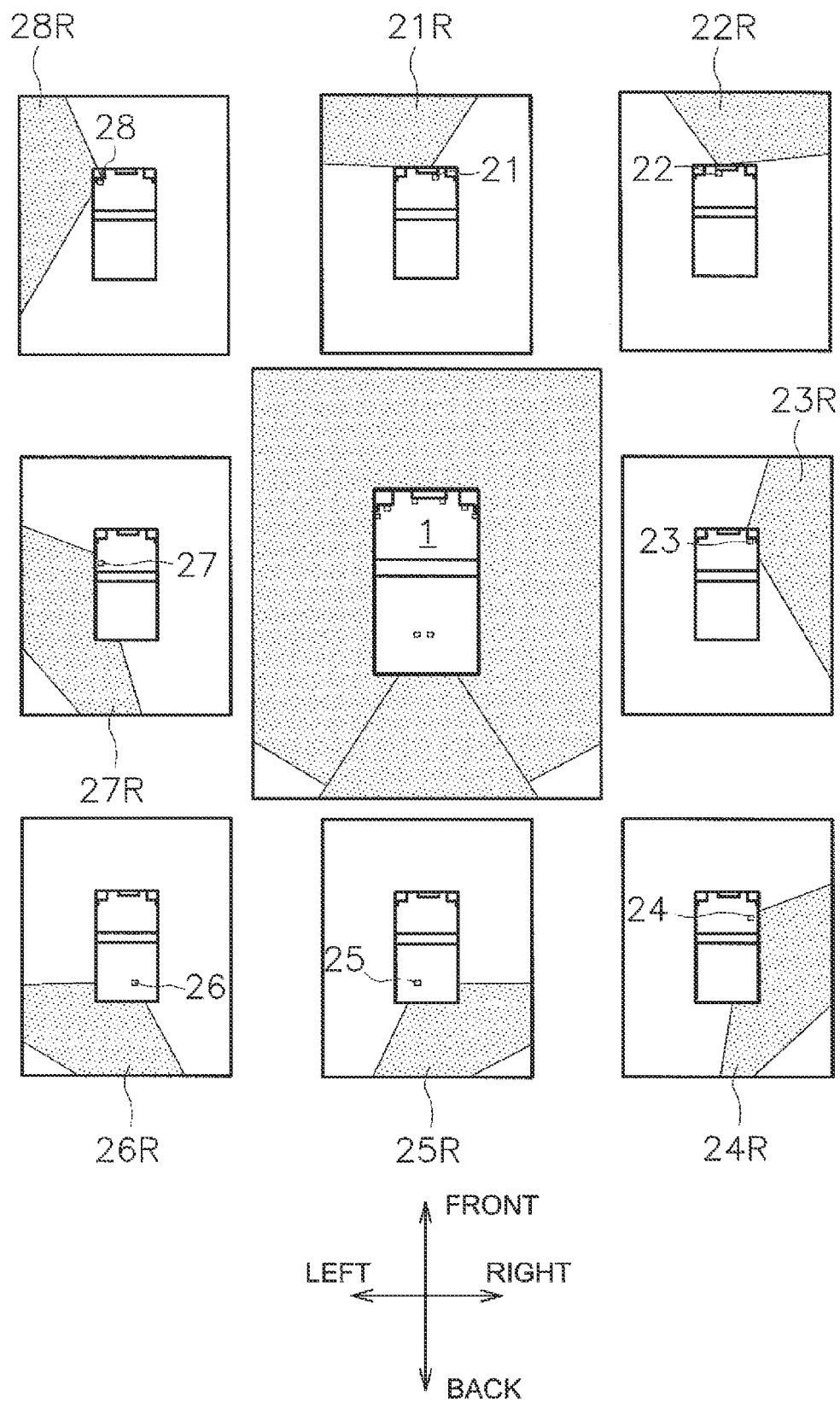
FIG. 4 is an upper surface diagram illustrating mounting positions and detection ranges of eight radar apparatuses 21 to 28.

The eight radar apparatuses 21 to 28 detect the relative position of an obstacle which is present in the surroundings of the dump truck 1. The eight radar apparatuses 21 to 28 are mounted on the outer periphery of the dump truck 1. FIG. 4 is an upper surface diagram of the dump truck 1 which illustrates mounting positions and detection ranges of the eight radar apparatuses 21 to 28. Here, in FIG. 4, the detection ranges are shown in a range which is used for the bird's-eye image 200 (refer to FIG. 7) which will be described later.

A first radar apparatus 21 is disposed above the lower deck 2A and a first detection range 21R is diagonally forward to the left from the front of the vehicle. A second radar apparatus 22 is disposed to the left side of the first radar apparatus 21 and a second detection range 22R is diagonally, forward to the right from the front of the vehicle. A third radar apparatus 23 is disposed at a front edge portion of a right side surface of the lower deck 2A and a third detection range 23R is to the right from the right front diagonal. A fourth radar apparatus 24 is disposed in between the lower deck 2A and the upper deck 2B at the side of the vehicle and a fourth detection range 24R is to the rear from the right. A fifth radar apparatus 25 is disposed in the vicinity of the axel shaft which connects the two rear wheels 6 and a fifth detection range 25R is to the rear from the right rear diagonal. A sixth radar apparatus 26 is disposed at the right side of the fifth radar apparatus 25 and a sixth detection range 26R is diagonally backward to the left from the rear. A seventh radar apparatus 27 is disposed at a position which is left and right symmetrical with the fourth radar apparatus 24 and a seventh detection range 27R is to the left from the rear. A eighth radar apparatus 28 is disposed at a position which is left and right symmetrical with the third radar apparatus 23 and a eighth detection range 28R is to the diagonally left to the front from the left.

According to the eight radar apparatuses 21 to 28 above, as shown in the center diagram of FIG. 4, it is possible to detect the relative position of an obstacle with regard to the dump truck 1 across substantially the entire surroundings of the dump truck 1. Each of the eight radar apparatuses 21 to 28 sends relative position data, which indicates the relative position of an obstacle which is detected by the apparatus, to the controller 100.

(3) Shift Lever 30, Vehicle Speed Sensor 40, and Monitor 50

The shift lever 30 is disposed in the vicinity of the driver's seat in the cab 3. The shift lever 30 is an operating member for an operator to switch the moving direction or level of speed of the dump truck 1. In the embodiment, the shift lever 30 sends shift lever position data, which indicates whether the shift lever is position in either for forward progression or backward progression, to the controller 100.

The vehicle speed sensor 40 acquires the vehicle speed of the dump truck 1. The vehicle speed sensor 40 is able to acquire the vehicle speed of the dump truck 1 based on the number of rotations of the engine and the like. The vehicle speed sensor 40 sends vehicle speed data, which indicates the vehicle speed which has been acquired, to the controller 100.

The monitor 50 is disposed in front of the driver's seat in the cab 3. The monitor 50 is able to display an image according to the control of the controller 100. Display examples of the monitor 50 will be described later.

(4) Controller 100

The controller 100 monitors the presence or absence of an obstacle in the surroundings of the dump truck 1 and warns the driver of the presence of an obstacle as required. As shown in FIG. 2, the controller 100 is provided with a movement state gauging section 110, a warning region setting section 120, a bird's-eye image acquisition section 130, and a warning section 140.

The movement state gauging section 110 receives the shift lever position data from the shift lever 30 and receives the vehicle speed data from the vehicle speed sensor 40. The movement state gauging section 110 gauges the movement state of the dump truck 1 based on a combination of moving direction and vehicle speed. Here, the movement state gauging section 110 specifies either forward progression or backward progression as the moving direction based on the shift lever position data.

Here, the movement state of the dump truck 1 is defined as "during forward progression" in a case where the moving direction is forward progression and the vehicle speed is larger than zero, is defined as "during backward progression" in a case where the moving direction is backward progression and the vehicle speed is larger than zero, and is defined as "stationary" irrespective of the moving direction in a case where the vehicle speed is zero. The movement state gauging section 110 transmits movement state data which indicates the movement state to the warning region setting section 120.

Figure 5A:
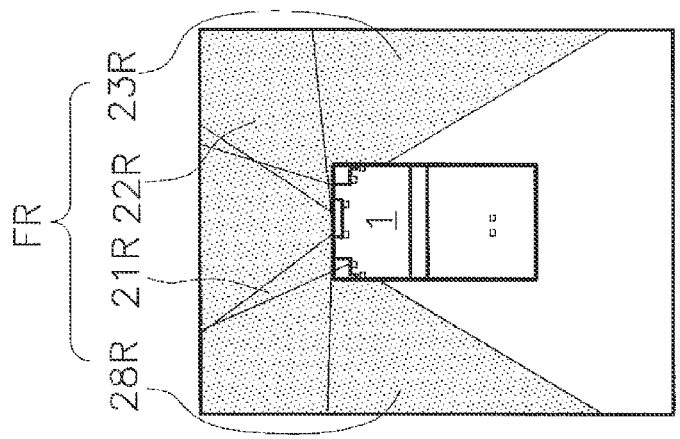
FIG. 5A is an upper surface diagram illustrating a warning region.
Figure 5B:
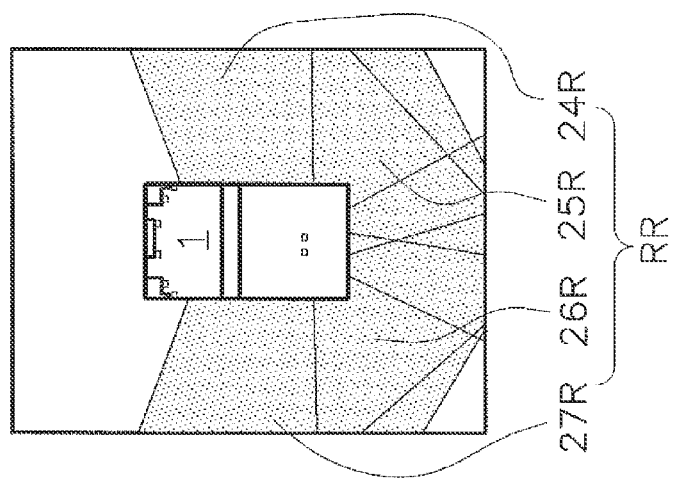
FIG. 5B is an upper surface diagram illustrating a warning region.
Figure 5C:
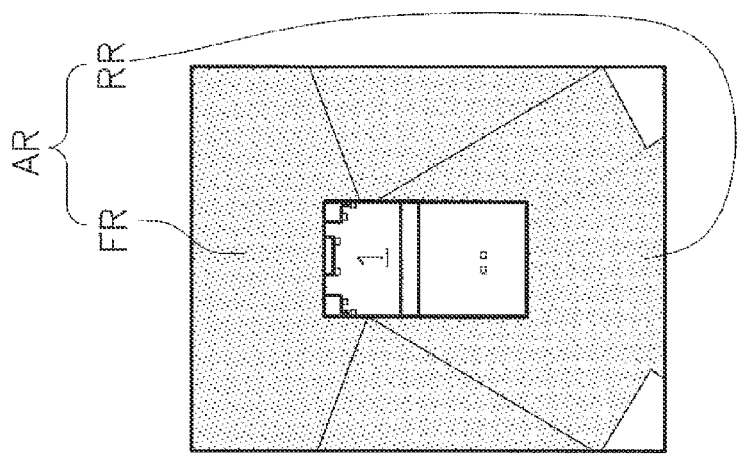
FIG. 5C is an upper surface diagram illustrating a warning region.

The warning region setting section 120 receives the movement state data from the movement state gauging section 110. The warning region setting section 120 sets the warning region where it is necessary to warn the driver of the presence of an obstacle according to the movement state of the dump truck 1. FIG. 5A to FIG. 5C are upper surface diagrams which show warning regions.

The warning region setting section 120 sets a front region FR as the warning region as shown in FIG. 5A in a case where the movement state of the dump truck 1 is "during forward progression". In the embodiment, the front region FR is a region which is a combination of a first detection region 21R, a second detection region 22R, a third detection region 23R and an eighth detection region 28R. In addition, the warning region setting section 120 sets a rear region RR as the warning region as shown in FIG. 5B in a case where the movement state of the dump truck 1 is "during backward progression". In the embodiment, the rear region RR is a region which is a combination of a fourth detection region 24R, a fifth detection region 25R, a sixth detection region 26R, and a seventh detection region 27R. In addition, the warning region setting section 120 sets all regions AR as the warning region as shown in FIG. 5C in a case where the movement state of the dump truck 1 is "stationary". In the embodiment, the all regions AR is a region which is a combination of the front region FR and the rear region RR. The warning region setting section transmits warning region data which indicates the warning region which has been set to the warning section 140.

The bird's-eye image acquisition section 130 receives a plurality of image data from each of the six cameras 11 to 16. The bird's-eye image acquisition section 130 acquires the bird's-eye image 200 (refer to FIG. 7) of the surroundings of the dump truck 1 based on the plurality of images which is indicated by the plurality of image data. Specifically, the bird's-eye image acquisition section 130 generates bird's-eye image data which indicates the bird's-eye image 200 where the plurality of images are videoed from a predetermined videoing plane. The bird's-eye image acquisition section 130 transmits the bird's-eye image data which has been generated to the warning section 140.

The warning section 140 warns the driver of the positioning of the relative position of an obstacle, which has been detected by at least one of the radar apparatuses out of the eight radar apparatuses 21 to 28, in the warning region. Specifically, as shown in FIG. 2, the warning section 140 has a determination section 141 and a display control section 142.

The determination section 141 receives the warning region data from the warning region setting section 120, receives the bird's-eye image data from the bird's-eye image acquisition section 130, and receives the relative position data from the eight radar apparatuses 21 to 28. The determination section 141 determines whether or not at least one of the radar apparatuses out of the eight radar apparatuses 21 to 28 has detected an obstacle based on the presence or absence of reception of the relative position data from the eight radar apparatuses 21 to 28.

In addition, the determination section 141 determines whether or not the relative position of the obstacle is positioned in the warning region on the bird's-eye image 200 in a case where it is determined that an obstacle has been detected by at least one of the radar apparatuses. In a case where it is determined that the relative position of the obstacle is positioned in the warning region, the determination section 141 notifies this to the display control section 142.

The display control section 142 receives the plurality of image data from each of the six cameras 11 to 16, receives the bird's-eye image data from the bird's-eye image acquisition section 130, and receives the relative position data from the eight radar apparatuses 21 to 28.

Figure 7A:
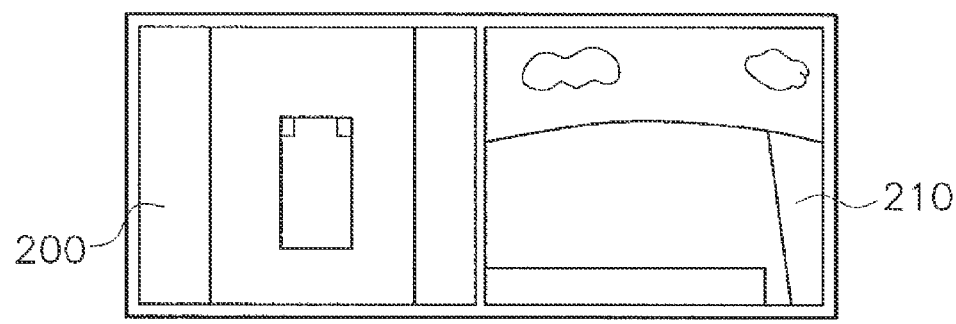
FIG. 7A is a schematic diagram illustrating a display example on a monitor 50.

The display control section 142 lines up and displays an image of a predetermined camera out of the six cameras 11 to 16 (referred to as "predetermined camera image 210". Refer to FIG. 7A and FIG. 7C)) and the bird's-eye image 200 on the monitor 50 in a case where notification is not received from the determination section 141 (that is, normally). It is preferable that the predetermined camera be selected according to the movement state of the dump truck 1. For example, it is preferable that the predetermined camera be the second camera 12 which videos the second videoing region 12R during forward progression and it is preferable that the predetermined camera be the sixth camera 16 which videos the sixth videoing region 16R during backward progression.

Figure 7B:
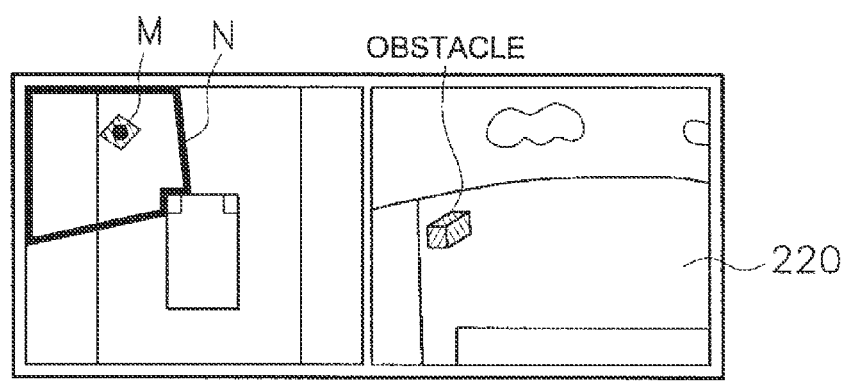
FIG. 7B is a schematic diagram illustrating a display example on the monitor 50.
Figure 7C:
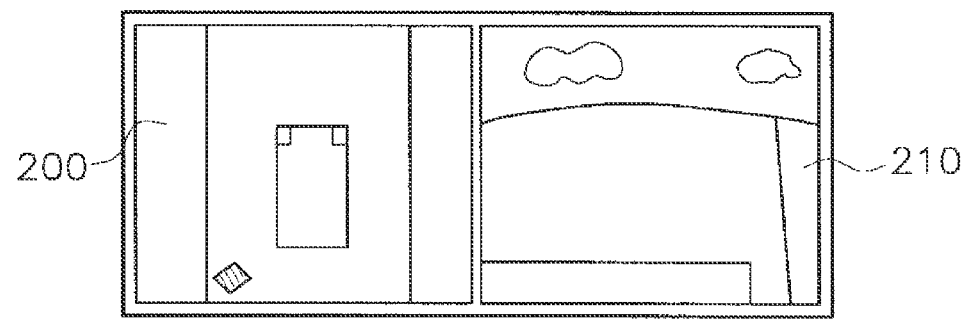
FIG. 7C is a schematic diagram illustrating a display example on the monitor 50.

On the other hand, in a case where the relative position of an obstacle is determined to be positioned in the warning region using the determination section 141, the display control section 142 lines up and displays an image of a camera out of the six cameras 11 to 16 which videos the obstacle which has been detected (referred to as "obstacle videoing camera image 220", and refer to FIG. 7B) and the bird's-eye image 200 on the monitor 50.

In addition, the display control section 142 overlays an identification mark M (refer to FIG. 7A and FIG. 7C) on the obstacle which has been detected on the bird's-eye image 200 which is displayed on the monitor 50. The identification mark M is a mark for making the obstacle visually conspicuous on the bird's-eye image 200 and it is possible to use a circle, a square, a triangle, or the like.

In addition, the display control section 142 displays an identification frame N (refer to FIG. 7B) which encompasses the surroundings of the obstacle which has been detected on the bird's-eye image 200 which is displayed on the monitor 50. The identification frame N is a frame for easily specifying the position of the obstacle in the bird's-eye image 200 and appropriate settings such as the size and shape of the frame are possible. In the embodiment, as will be described later, outer edges of the videoing region of the obstacle videoing camera (any one out of the first to the sixth videoing regions 11R to 16R) is set as the identification frame N.

Operation of Periphery Monitoring Apparatus 10

Figure 6:
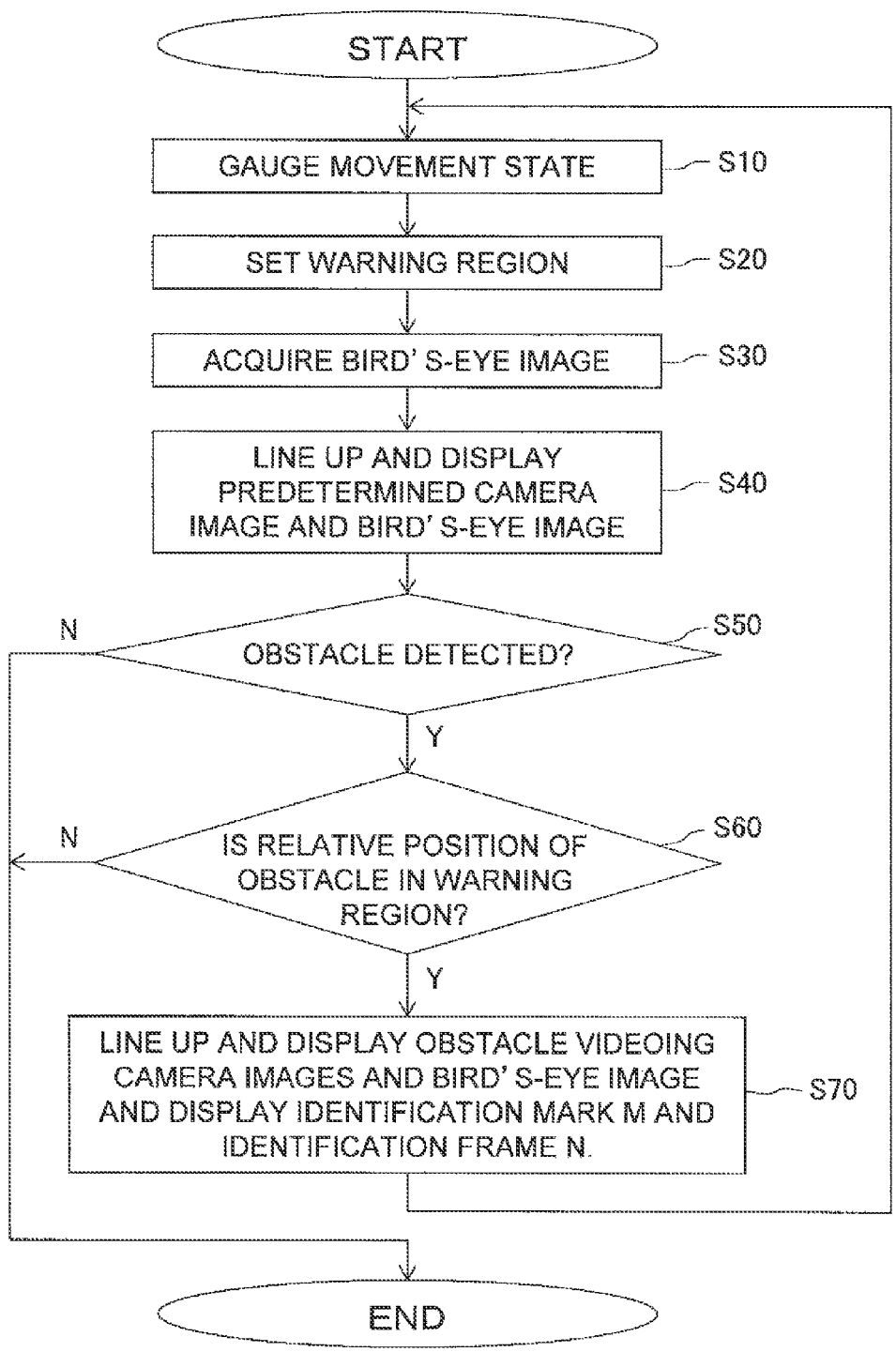
FIG. 6 is a flow diagram for describing operations of the periphery monitoring apparatus 10.

FIG. 6 is a flow diagram for describing operations of the periphery monitoring apparatus 10. FIGS. 7A to 7C are schematic diagrams illustrating display examples on the monitor 50. In the description below, the driver carries out forward progression of the dump truck 1.

In step S10, the movement state gauging section 110 gauges the movement state of the dump truck 1 based on the combination of the moving direction and the vehicle speed. Here, a case is assumed where the movement state of the dump truck 1 is gauged to be "during forward progression".

In step S20, the warning region setting section 120 sets the warning region where it is necessary to warn the driver of the presence of an obstacle according to the movement state of the dump truck 1. In step S20, the front region FR is set as the warning region since the case is assumed where the movement state is "during forward progression".

In step S30, the bird's-eye image acquisition section 130 acquires the bird's-eye image 200 of the surroundings of the dump truck 1 based on the plurality of images which are acquired by the six cameras 11 to 16.

In step S40, the display control section 142 lines up and displays the bird's-eye image 200 and the predetermined camera image 210 on the monitor 50. FIG. 7A is a schematic diagram illustrating a display example in step S40. As shown in FIG. 7A, the bird's-eye image 200 and the predetermined camera image 210 are lined up side by side and displayed on the monitor 50. The predetermined camera image which is shown in FIG. 7A is a real time image of the second camera 12 which videos the second videoing region 12R.

In step S50, the determination section 141 determines whether or not at least one of the radar apparatuses out of the eight radar apparatuses 21 to 28 detects an obstacle. In a case where any one of the eight radar apparatuses 21 to 28 has detected an obstacle, the process proceeds to step S60. In a case where none of the eight radar apparatuses 21 to 28 has detected an obstacle, the process is terminated temporarily and moves to a new process.

In step S60, the determination section 141 determines whether or not the relative position of the obstacle is positioned in the warning region (here, the front region FR) on the bird's-eye image 200. In a case where the relative position of the obstacle is positioned in the warning region on the bird's-eye image 200, the process proceeds to step S70. In a case where the relative position of the obstacle is not positioned in the warning region on the bird's-eye image 200, the process is terminated and moved to the next process.

In step S70, the display control section 142 lines up and displays the obstacle videoing camera image 220 and the bird's-eye image 200 on the monitor 50. In addition, the display control section 142 overlays the identification mark M on the obstacle and displays the identification frame N which encompasses the obstacles in the bird's-eye image 200 displayed on the monitor 50. FIG. 7B is a schematic diagram illustrating a display example in step S70. As shown in FIG. 7B, the obstacle videoing camera image 220 is displayed to be lined up with the bird's-eye image 200 on the monitor 50. The obstacle videoing camera image 220 which is shown in FIG. 7B is a real time image of the third camera 13 which videos the third videoing region 13R.

After this, steps S10 to S70 are repeatedly executed, but the process is terminated temporarily and moves to a new process in a case where an obstacle is not detected in step S50 or in a case where the relative position of the obstacle is outside of the warning region in step S60. FIG. 7C is a schematic diagram illustrating a display example in step S40 which is the next process. In FIG. 7C, there is a return to a state where the predetermined camera image 210 is displayed according to the obstacle moving to the rear of the dump truck 1 and being outside of the warning region.

Actions and Effects (1) The periphery monitoring apparatus 10 is provided with the warning region setting section 120 and the warning section 140. The warning region setting section 120 sets the warning region where it is necessary to warn the driver of the presence of an obstacle according to the movement state of the dump truck 1. The warning section 140 warns the driver of the positioning of the relative position of an obstacle, which has been detected by at least one of the radar apparatuses out of the eight radar apparatuses 21 to 28, in the warning region.

In this manner, since the warning region is set according to the movement state of the dump truck 1, it is possible to suppress warnings being carried out in cases where the necessity of warning the driver of the presence of an obstacle is low in consideration of the movement state.

(2) The movement state of the dump truck 1 is defined by a combination of moving direction and vehicle speed.

As a result, it is possible to simply gauge the movement state to correspond to the various movement states of the dump truck 1.

(3) The warning section 140 has the display control section 142. The display control section 142 displays the obstacle videoing camera image 220 on the monitor 50 in a case where it is determined that the relative position of the obstacle is positioned in the warning region by the determined section 141.

In this manner, it is possible for the driver to easily grasp the presence of the obstacle since it is possible to visually warn the driver of the presence of the obstacle.

(4) The display control section 142 displays the bird's-eye image 200 to line up with the obstacle videoing camera image 220 on the monitor 50.

Accordingly, it is possible for the driver to more easily grasp the presence of the obstacle since it is possible for the position of the obstacle to be visually recognized by the driver on the bird's-eye image 200.

(5) The display control section 142 overlays the identification mark M on the obstacle in the bird's-eye image 200 which is displayed on the monitor 50. In addition, the display control section 142 displays the identification frame N which encompasses the obstacle in the bird's-eye image 200 which is displayed on the monitor 50.

Accordingly, it is possible for the driver to more easily grasp the presence of the obstacle since the obstacle is more conspicuous on the bird's-eye image 200.

Other Exemplary Embodiments

Above, an embodiment of the present invention has been described, but the present invention is not limited to the embodiment described above and various changes are possible within a scope which does not depart from the gist of the invention.

Figure 8:
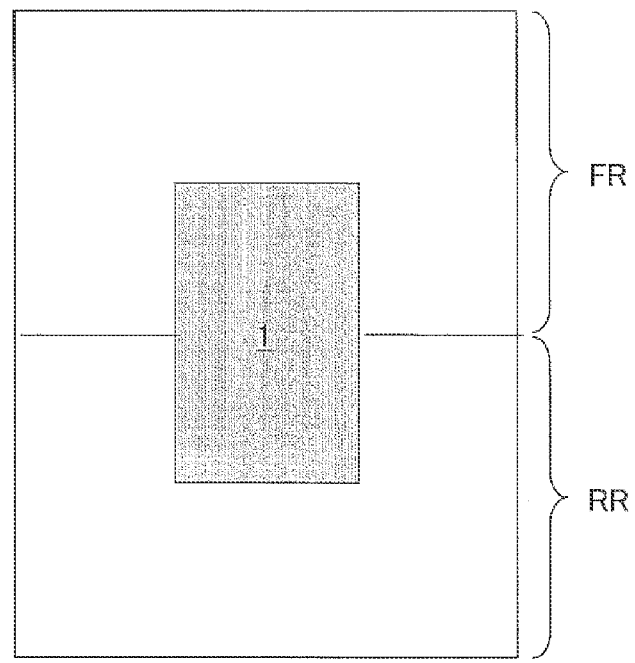
FIG. 8 is an upper surface diagram illustrating a warning region.
Figure 9:
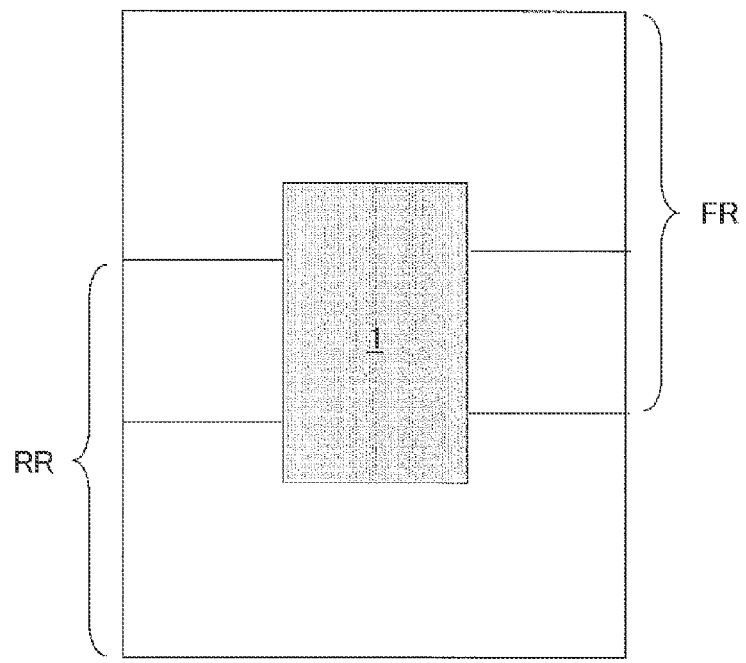
FIG. 9 is an upper surface diagram illustrating a warning region.

(A) in the embodiment described above, the warning region is divided into the front region FR and the rear region RR as shown in FIGS. 5A to 5C but the present invention is not limited to this. The warning region may be divided into three or more regions. In addition, as shown in FIG. 8, it is possible for the boundary of the front region FR and the rear region RR to be set in an arbitrary position. Furthermore, as shown in FIG. 9, there may be a portion where the front region FR and the rear region RR overlap each other.

(B) in the embodiment described above, the warning section 140 warns the driver that the relative position is positioned in the warning region by the obstacle videoing camera image 220 being displayed on the monitor but the present invention is not limited to this. The warning section 140 may warn the driver by sounding a warning sound from a speaker instead of displaying an image on the monitor 50. In addition, the warning section 140 may warn the driver by illuminating a light emitting device which is provided in front of the driver's seat instead of displaying an image on the monitor 50.

(C) In the embodiment described above, the display control section 142 displays the bird's-eye image 200 to line up with the obstacle videoing camera image 220 on the monitor 50 but the present invention is not limited to this. The display control section 142 may display only the obstacle videoing camera image 220 on the monitor 50.

(D) In the embodiment described above, the display control section 142 displays the identification mark M and the identification frame N on the bird's-eye image 200 but the present invention is not limited to this. The display control section 142 need not display the identification mark M and the identification frame N on the bird's-eye image 200.

(E) In the embodiment described above, the display control section 142 sets the outer edges of the videoing region of the obstacle videoing camera as the identification frame N but the present invention is not limited to this. It is sufficient if the identification frame N is larger than the identification mark M and there is no limit to this size or shape.

(F) Although not mentioned in the embodiment described above, it is possible to set the warning region by turning off the power source of several of the radar apparatuses out of the eight radar apparatuses 21 to 28 according to the movement state. In this case, the detection range of the radar apparatuses where the power source is on matches with the warning region. Here, the relative position data itself is not output from the radar apparatuses where the power source has been turned off. As a result, the warning section 140 need not have the determination section 141 since this has the meaning of the acquisition of the relative position data by the warning section 140, that is, the obstacle being positioned in the warning region.

(G) In the embodiment described above, the dump truck 1 is provided with the base 7 but need not be provided with the base 7.

The invention claimed is:

1. A periphery monitoring apparatus for a work vehicle comprising:
    a plurality of radar apparatuses mounted on the work vehicle, each of the radar apparatuses being configured to determine a relative position of an obstacle with regard to the work vehicle by detecting the obstacle within a detection range of the radar apparatus, the detection range being disposed in a portion of the surroundings of the work vehicle, the plurality of radar apparatuses including at least two radar apparatuses arranged such that the detection ranges thereof overlap each other and are disposed on a right side of the work vehicle, and the plurality of radar apparatuses further including at least two other radar apparatuses arranged such that the detection ranges thereof overlap each other and are disposed on a left side of the work vehicle, the plurality of radar apparatuses being arranged such that a combination of the detection ranges of at least the two radar apparatuses having detection ranges disposed on the right side of the work vehicle and the two other radar apparatuses having detection ranges disposed on the left side of the vehicle defines an overall detection region that fully surrounds the vehicle;
    a movement state determining section configured to determine a movement state of the work vehicle;
    a warning region setting section configured to set a single warning region in which it is necessary to warn a driver of a presence of the obstacle, the warning region being set according to the movement state of the work vehicle, the warning region corresponding to the detection ranges of at least two of the radar apparatuses, the warning region setting section being configured to set the warning region to correspond to the overall detection region when the movement state determining section determines that the work vehicle is in a stationary state;
    a warning section configured to warn a driver of the presence of the detected obstacle if the detected obstacle is positioned in the warning region, and not warn the driver of the presence of the detected obstacle if the detected obstacle is not positioned in the warning region;
    a plurality of cameras mounted on the work vehicle, each of the cameras being configured to acquire an image of the surroundings of the work vehicle; and
    a bird's-eye image acquiring section configured to acquire a bird's-eye image of the surroundings of the work vehicle based on a plurality of images which are acquired by the cameras,
    the warning section having a determination section configured to determine whether the relative position is positioned in the warning region on the bird's-eye image.

2. The periphery monitoring apparatus for a work vehicle according to claim 1, wherein
    the movement state is defined by a combination of moving direction and vehicle speed.

3. The periphery monitoring apparatus for a work vehicle according to claim 1, further comprising
    a monitor configured to display an image, wherein
    the warning section has a display control section configured to display a camera image on the monitor when it is determined that the relative position is positioned in the warning region on the bird's-eye image, the camera image being acquired by one of the cameras which is acquiring the image of the obstacle.

4. The periphery monitoring apparatus for a work vehicle according to claim 3, wherein
    the display control section is configured to display the bird's-eye image on the monitor to be lined up with the camera image.

5. The periphery monitoring apparatus for a work vehicle according to claim 4, wherein
    the display control section is configured to overlay an identification mark on the obstacle in the bird's-eye image displayed on the monitor.

6. The periphery monitoring apparatus for a work vehicle according to claim 4, wherein
    the display control section is configured to display an identification frame encompassing the obstacle in the bird's-eye image displayed on the monitor.

* * * * *